United States Patent [19]
Louis

[11] Patent Number: 5,212,473
[45] Date of Patent: May 18, 1993

[54] MEMBRANE KEYBOARD AND METHOD OF USING SAME

[75] Inventor: William M. Louis, Encinitas, Calif.

[73] Assignee: TypeRight Keyboard Corp., Encinitas, Calif.

[21] Appl. No.: 658,541

[22] Filed: Feb. 21, 1991

[51] Int. Cl.$^5$ ............................................. G09G 3/02
[52] U.S. Cl. ...................................... 340/711; 341/22;
    341/27; 200/513; 200/516; 200/517; 361/380
[58] Field of Search ..................... 340/711, 700, 407;
    341/21, 22, 27, 24; 200/512.5 A, 513, 511, 517,
    520, 521, 516, 515; 248/917, 921, 918, 922, 919,
    923, 920; 400/100, 472, 491.3, 680, 682, 691,
    693; 364/709.06, 710.01, 189, 708; 361/380;
    235/1 D

[56] References Cited

U.S. PATENT DOCUMENTS

| | | | |
|---|---|---|---|
| 2,527,016 | 10/1950 | Loung | 400/680 |
| 3,860,771 | 1/1975 | Lynn et al. | 400/491.3 |
| 4,028,560 | 6/1977 | Bainter | 341/24 |
| 4,109,118 | 8/1978 | Kley | 200/5 E |
| 4,113,212 | 9/1978 | Coriden | 248/917 |
| 4,334,280 | 6/1982 | McDonald | 364/709.06 |
| 4,640,994 | 2/1987 | Komaki | 200/5 A |
| 4,933,522 | 6/1990 | Celander | 200/513 |
| 5,119,078 | 6/1992 | Grant | 340/711 |

OTHER PUBLICATIONS

IBM Technical Disclosure Bulletin, "Key Matrix Using a Fluid Medium" by Cook et al. vol. 13, No. 3, dated Aug. 1970, p. 744.

IBM Technical Disclosure Bulletin, "Briefcase-Portable Text-written with 100-key Full-Size Keyboard" by Pechanek et al. vol. 27, No. 4A, dated Sep. 1984, pp. 2002-2004.

IBM Technical Disclosure Bulletin, "Folding Computer" by IBM Corp., vol. 32, No. 10B, dated Mar. 1990, pp. 266-267.

Primary Examiner—Jeffery A. Brier
Assistant Examiner—Jick Chin
Attorney, Agent, or Firm—Bernard L. Kleinke; Jerry R. Potts; William Patrict Waters

[57] ABSTRACT

A membrane keyboard producing audible and tactile responses when individual character keys are depressed. To facilitate typing efficiency, the keyboard has membrane characters keys with different transverse heights and adjustable sensory responses.

27 Claims, 6 Drawing Sheets

MEMBRANE KEYBOARD AND METHOD OF USING SAME

CROSS-REFERENCE TO RELATED APPLICATION

Copending U.S. patent application, entitled "KEYBOARD ARRANGEMENT AND METHOD OF USING SAME," filed concurrently herewith on Feb. 21, 1991, assigned Ser. No. 07/659,604, is hereby incorporated by reference as if fully set forth herein.

TECHNICAL FIELD

The present invention relates in general to keyboards and methods of using them. The invention more particularly relates to a membrane keyboard for helping to facilitate the entry of information in a fast and accurate manner, while helping to relieve physical stress on the user.

BACKGROUND ART

There have been many different types and kinds of keyboards for producing signal responses when depressed. For example, membrane keyboards are usually generally flat or planar in configuration. They do not ordinarily have the same type of audible and tactile feedback response as the conventional discrete keys. The keys of membrane keyboards are usually generally flat and have little or no perceivable travel, and thus little or no tactile response is produced when depressed Also, there is usually no perceivable audible sound, such as a "click" heard by a discrete key.

The lack of such sensory responses causes a user to be uncertain that individual keys have been depressed sufficiently to produce a character. Thus, the user can become frustrated and is oftentimes unable to enter information in a fast and efficient manner. Therefore, it would be highly desirable to have a new and improved membrane keyboard having audible and tactile feedback responses to alert the user when the key was properly actuated to enter the desired information.

Another reason for the poor acceptance of the membrane keyboard in many applications, is not only the lack of perceivable audible and tactile feedback, but also because the membrane keys are substantially flat. In this regard, it has been generally recognized that for rapid and efficient keyboard entry purposes, different keys should have different vertical heights and be positioned at different angles, so the user can conveniently reach all of the keys on the keyboard Such non-uniform positioning of keys is required in part because of the physical structure of the hands and fingers of the user, as well as the different finger-to-key strokes utilized for rapid keyboard entry. Thus, for efficient use of a keyboard, the individual character keys should be arranged in rows having discrete height differences to provide the keyboard with an overall generally dished working surface. Since membrane keys are substantially flat, they do not lend themselves to forming such a dished surface, which is important for helping provide a more efficient keyboard operation.

Additionally, as more fully described in the foregoing mentioned co-pending application, prior known conventional keyboards, including membrane or planar keyboards can cause physiological injury to the user, after repeated use over long periods of time. Such repetitive stress injuries are collectively referred to as cumulative trauma disorder. Thus, the new and improved keyboard and method of using it should help relieve stress and thus help prevent physical injuries to the user. This should be accomplished without cumbersome, mechanical adjustments of the keyboard housing. Moreover, at the same time, it should be constructed to facilitate fast and accurate keyboard entry, so that a new user can quickly learn to use such a new membrane keyboard, with little or no unwanted time consuming delays. In this regard, some one who is trained in touch typing techniques, should be able to use such a new membrane keyboard with little or no training.

Therefore it would be highly desirable to have a new and improved membrane keyboard, which would be comfortable to use in a fast and convenient manner, and which could be used in a less physiologically stressful manner.

DISCLOSURE INVENTION

Therefore, it is the principal object of the present invention to provide a new and improved membrane keyboard and method of using it, to help the user know when the information has been successfully entered.

Another object of the present invention is to provide such a new and improved membrane keyboard and method of using it, to enable a user to enter information in a fast and accurate manner, without undue physiological stress to the user.

Briefly, the above and further objects of the present invention are realized by providing a membrane keyboard construction with a group of membrane keys, which are adjustable as a group for tactile and audible responses. The keys are arranged in staggered rows and columns to facilitate speed and accuracy of the operator. The keys have different heights for helping a user to reach conveniently all of the keyboard keys. The keyboard includes a pair of inner and outer molded sheets to form the keys. A force sensing resistor device is actuated by the inner sheet when a key is pressed, to cause character information to be entered. A sensory control circuit including a force producing device, enables tactile and audible responses to be adjusted for the user.

In another form of the invention, the tactile and audible responses are caused by providing a liquid sealed between the inner and outer sheets, and electrically energized heating coils cause the liquid to expand rapidly and abruptly to provide a tactile and audible response.

BRIEF DESCRIPTION OF THE DRAWINGS

The above mentioned and other objects and features of this invention and the manner of attaining them will become apparent, and the invention itself will be best understood by reference to the following description of the embodiments of the invention in conjunction with the accompanying drawings wherein.

BEST MODE FOR CARRYING OUT THE INVENTION

Figure 1:
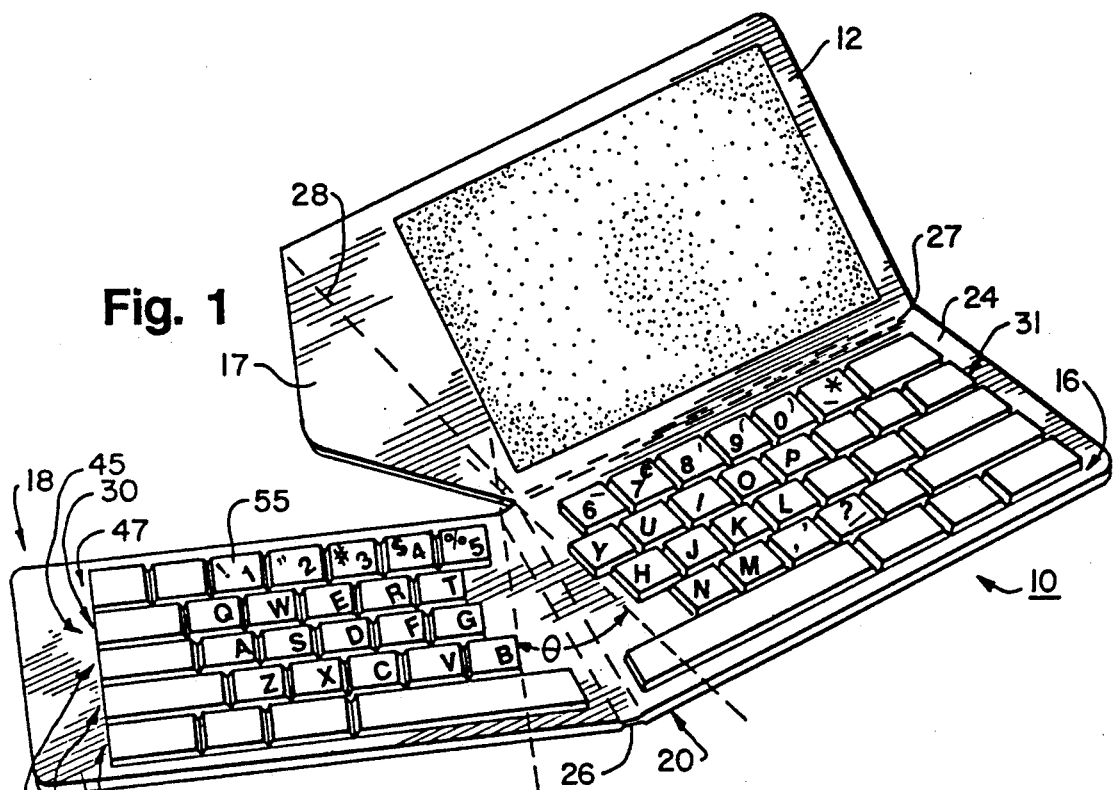
FIG. 1 is a pictorial view of a membrane keyboard constructed in accordance with the present invention and illustrated forming a part of a foldable computer having a liquid crystal display panel.

Referring now to the drawings and more particularly to FIG. 1 thereof, there is shown a membrane keyboard system 10 which is constructed in accordance with the present invention. The system generally comprises a liquid crystal display panel 12 for visually displaying character information, a microprocessor 14 (FIG. 4) for processing information and a membrane keyboard 16 for permitting a user to enter information into the microprocessor 14 for processing and display purposes. The display panel 12, microprocessor 14 and membrane keyboard 16 are mounted in a substantially flat foldable system housing unit 18. In this regard, the housing unit 18 is foldable into a thin, flat generally rectangularly shaped compact unit that may be conveniently carried by a user.

In operation, the system 10 permits a user to enter data quickly and accurately into the microprocessor 14 for processing purposes. In this regard, a skilled touch typist is able to use the membrane keyboard 16 for entering data at substantially the same speed and with substantially the same accuracy according to familiar touch typing techniques.

To use the system 10, a user unfolds the housing unit 18 into its operating configuration as best seer in FIG. 1. In this regard, when the housing unit 18 is unfolded, the system 10 is immediately powered by the portable power source causing the microprocessor 14 to produce a reference character such as a cursor on the display panel 12. The user then begins entering information into the microprocessor 14 via the membrane keyboard 16 in substantially the same manner as a touch typist would do according to familiar touch typing techniques.

As best seen in FIG. 1, the interconnected membrane keys are arranged in rows and columns, where the individual rows of character keys have different transverse height to facilitate the rapid and efficient entry of character information. Also, as will be explained hereinafter in greater detail, sensory responses are produced as the user enters information in order to further facilitate the rapid and efficient entry of information. In this regard, when a user presses any one of the character keys, the user will sense a tactile response in the form of a gentle reaction force, indicating that the selected key has been successfully actuated. In addition, the user will also hear a audible sound indicative of the selected key having been successfully actuated.

Considering now the membrane keyboard 16 in greater detail with reference to FIGS. 1-4, the keyboard 16 generally comprises a keyboard housing 20 which forms an integral part of the system housing unit 18. In this regard, the keyboard housing 20 includes a left hand portion 22 and a right hand portion 24 that are mounted hingeably together through a living hinge, shown generally at 26. For the purpose of permitting the system 10 to be folded into a substantially flat package for storage or transportation purposes, the right portion 24 of the housing unit 20 is mounted hingeably to the liquid crystal panel 12 by a living hinge 27. Another living hinge 28 integrally connects a triangularly shaped support flap 17 for helping to support the panel 12 in an upright position as shown in FIG. 1.

The keyboard housing 20 is composed of a suitable thermoplastic material that may be folded repeatedly about the living hinges In this regard, it should be noted that when the left portion 22 of the keyboard housing 20 is folded away from the right portion 24 into their illustrated opened position in a side by side configuration, the right and left portions 22 and 24 become disposed at an angle $\theta$ of between about 25° and about 36° relative to one another. A more preferred angle $\theta$ is between about 30° and about 33°, and a most preferred angle of $\theta$ is about 31°.

The configuration of character keys in the left side 22 and the right side 24 of the keyboard 16 is more fully described in the above mentioned copending U.S. patent application.

The membrane keyboard 16 also includes a left side keypad arrangement and right side keypad arrangement shown generally at 30 and 31 respectively. As the construction of the keypad arrangements 30 and 31 are substantially similar to one another, only the leftside keypad arrangement 30 will be described in greater detail.

Considering now the keypad arrangement 30 in greater detail with reference to FIGS. 1-4, the left keypad arrangement 30 generally comprises a keypad printed circuit board 32 (FIG. 3) and a control circuit 70 (FIG. 4) for generating electrical signals to produce sensory responses and codes when the individual character keys are depressed. Arrangement 30 also includes a membrane panel 33 having a generally rectangular group of membrane character keys, such as keys 34–39 shown in FIG. 2. The membrane keys, such as keys 34–39, are configured or arranged in a series of parallel spaced apart, staggered rows, such as rows 40, 41, 43, 45, and 47, and columns, such as 42, 44, and 46 to facilitate touch typing techniques by an operator.

Figure 2:
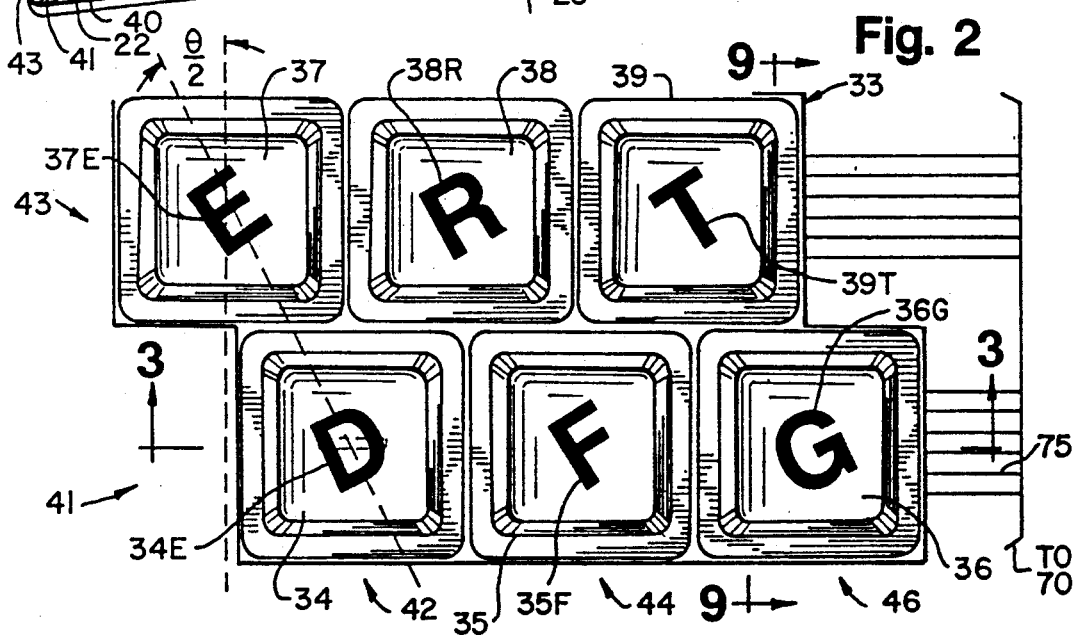
FIG. 2 is an enlarged face view of a group of representative keys of the keyboard of FIG. 1.

As best seen in FIGS. 1 and 2, selected ones of the character keys have a character indicia dispersed thereon, such as the character indicia 34D, 35F, 36G, 37E, 38R, and 39T on keys 34 -39 respectively. The character indicia on each of the selected keys, such as indicia 37E is disposed at an angle $\theta/2$ relative to the transverse dimension of the group 30.

Figure 3:
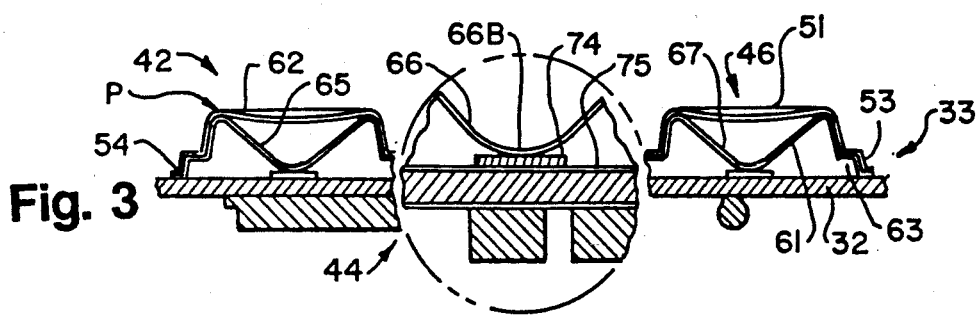
FIG. 3 is a sectional view of the keys of FIG. 2 taken substantially on line 3—3 thereof, illustrating an enlarged circled portion.

Considering now the panel 33 in greater detail with reference to FIGS. 2-3, the panel 33 generally comprises a pair of inner and outer thin sheets of thermoplastic material bonded together by any suitable means, such as heat welding. In this regard, the panel 33 includes an outer keypad sheet 51 for forming the individual character keypads, such as pads 34–39, and an inner sheet 61 for establishing a communication path between the individual character keys, such is keys 34–39, and a plurality of keypad control circuits, such as the keypad control circuits 31A, 31B, and 31C as shown in FIG. 1.

For the purpose of forming the individual character keypads, the keypad sheet 51 is molded into the character keys, each having finger engageable recessed keypads or top wall P that are integrally connected and arranged in a common plane. Each keypad is generally rectangularly shaped and spaced apart from the adjoining keypads, by valley members, such as the valley member 53. As best seen in FIG. 1, character indicia, such as character indicia 55, is disposed on the top surface of each of the keypads for helping a user identify the character code to be produced when the user presses a given key.

For the purpose of facilitating the manufacture of the membrane keyboard 16, the inner sheet 61 is folded by any well known technique, such as vacuum forming or injection molding. In this regard, the sheet 61 is molded into a series of parallel spaced-apart downwardly depending cup-shaped valleys such as the valleys 65, 66, and 67. Each valley is integrally connected, and has a bottom wall arranged in a common plane with like bottom walls. Each valley also terminates in an angular ridge defining a lip, such as a lip or rim 62. Each cup-shaped valley is spaced apart from adjoining valleys by a rectangularly shaped receiving member, such as a member 63.

As will be explained hereinafter in greater detail, of the purpose of facilitating the bonding of sheets 51 and 61 together, each receiving member, such as the inner member 63 is complementary shaped to an associated outer valley member, such as valley member 53 to nest together. In this regard, when the keypad sheet 51 and inner sheet 61 are positioned in mating engagement for bonding purposes, the valley members are received within corresponding areas of the receiving members to form the individual character key, such as keys 34-39. Thus, the individual cup-shaped valleys, such as the valley 65, form a finger-like ridge (FIG. 3) that cooperate with a corresponding top wall or pad P to form a membrane character key.

Figure 9:
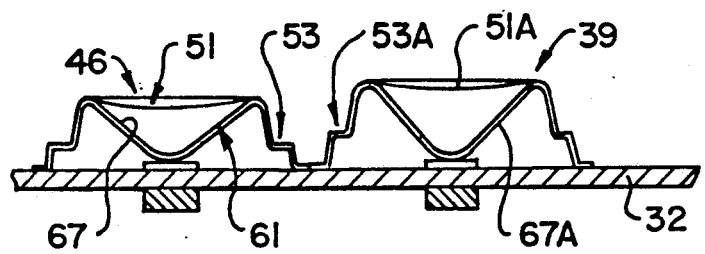
FIG. 9 is a sectional view of the keys of FIG. 2 taken substantially on line 9—9 thereof.

As best seen in FIG. 2, the character keys of panel 33 are arranged in a series of rows, such as the rolls 41 and 43. In order to facilitate arranging the rows in different heights, as shown in FIG. 9, the sheet 51 and 61 include different dimensioned keypads and valleys, such as keypad 57A and valley 67A. In this regard, for example, the keypad of character key 46 does not extend upwardly at as great a distance as keypad 57A, nor does the valley 67 extend downwardly as far as the valley 67A. Thus, when the sheets 51 and 67 are positioned matingly together, the height of the character keys in row 43, such as the character key 39 will be slightly higher than the character keys in row 41, such as the character key 46.

Figure 4:
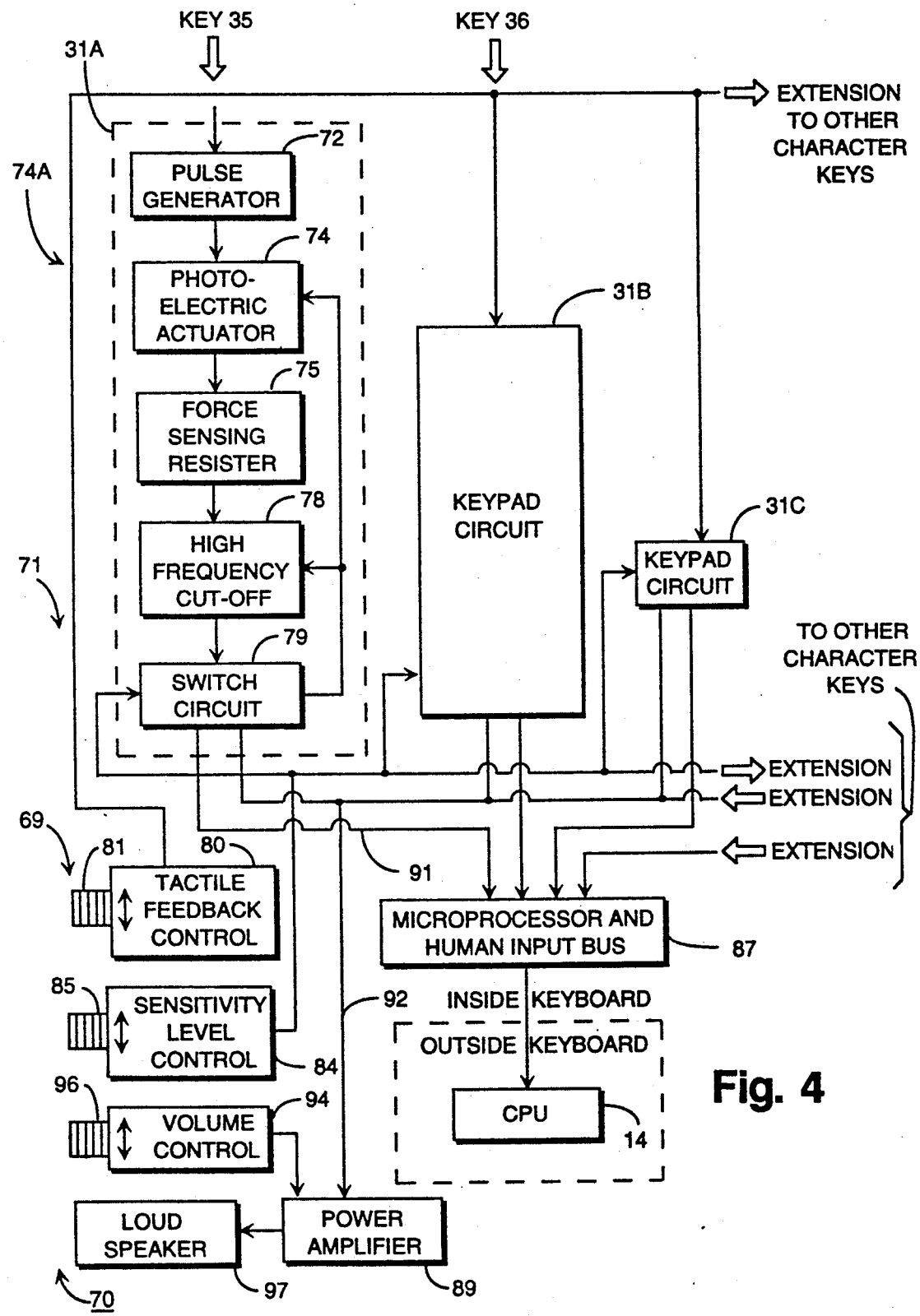
FIG. 4 is a block diagram of an electronic circuit arrangement for the keyboard of FIG. 1.

Considering now the keypad printed circuit board 32 and control circuit 70 in greater detail with reference to FIG. 3, and 4, the printed circuit board 32 is mounted within the left portion 22 of the housing 20, and is generally rectangular shaped with a generally flat face so that the keyboard panel 33 can be mounted thereto. In this regard, each of the valley members and receiving members, such as members 53 and 63 respectively, include a well, such as a well 54 (FIG. 3), that is adapted to be bonded to one of the surfaces of he printed circuit board 32 by any well known bonding technique, such as heat welding technique. In this regard, it will be understood by those skilled in the art, that each well, such as well 54, functions as bonding surfaces for joining the sheets 51 and 61 together, as well as for attaching the bonded sheets 51 and 61 to the printed circuit board 32.

For the purpose of controlling the sensory response of each individual character key, such as the character key 34, as shown in FIG. 4, the control circuit 70 includes a sensory control circuit 69 and an array of individual keypad circuits, such as the circuit 31A, 31B and 31C. As the individual keypad circuits, such as circuit 31A are substantially identical only circuit 31A will be described hereinafter in greater detail.

Considering now the circuit 31A in greater detail with reference to FIGS. 3 and 4, the circuit 31A includes a force sensing circuit 71 for detecting when the key 35 is pressed and a piezoelectric device 74A for producing a tactile response indicative that key 35 has been pressed sufficiently to enter a character code. To produce the tactile response, the piezoelectric device 74A includes a pulse generator 72 and a piezoelectric actuator 74. The pulse generator 72 drives the piezoelectric actuator 74 and is coupled between the actuator 74 and a tactile feedback control circuit 80 that enables a user to adjust the amplitude or strength of the tactile response produced by the actuator 74. In this regard, a resistor pot 81 permits the user to adjust the tactile response to the individual preference of the user.

The piezoelectric actuator 74 and the force sensing circuit 71 are mounted to the top surface of printed circuit board 32 in relation to the valley member 65 associated with key 35. In this regard, the piezoelectric actuator 74 and its associated character key 35 are mounted in close proximity to one another so that, a base or floor portion 66B (FIG. 3) of the valley member 66 abuts and contacts the actuator 74. By mounting the actuator 74 in close proximity to the key 35, the actuator 74 can produce a tactile response that will be sensed by the finger of a user resting in contact with the key 34.

For the purposes of sensing when the character key 35 has been pressed, the force sensing circuit 71 includes a force sensing resistor 75 and a control arrangement including a high frequency cut-off circuit 78 and switch circuit 79. The forces sensing resistor 75 includes a silk screened polymer material having a variable conductive property. The force sensing resistor 75 is disposed in close proximity to the base portion 66B of the valley member 65 so that when a user exerts a downwardly directed force on the top surface of key 35, the force will be sensed to cause the electrical conductance of the polymer material to be varied. As will be explained hereinafter in greater detail, the change in conductance of the polymer material causes an electrical signal to be generated to activate the piezoelectric actuator 74 and to cause an audible sound to be produced.

In order to produce an electrical signal in response to a character key 35 being pressed, the force sensing resistor 75 is electrically coupled to the switch circuit 79 via the high frequency cut off circuit 78. The high frequency cut off circuit 78 helps to eliminate unwanted and undesired accidental multiple keystrokes by the user when the user presses the character key 34. In this regard, the circuit 78 will allow only signals to pass which occur at spaced apart intervals of one tenth of a second or longer.

In order to control the sensitivity or the amount of pressure that must be exerted by a user with reference to actuating a given character key, such as character key 35, the switch circuit 79 is coupled to a sensitivity level control circuit 84. In this regard, the sensitivity circuit 84 establishes a pressure threshold voltage reference for the switch circuit 79 so that it generates an output signal only when the desired threshold is reached. The pressure threshold voltage produced by the circuit 84 is adjustable via a resistor pot 85. This allows for incremental input detection, and the setting of a response threshold from heavy to very light finger pressures depending on the preference of the user.

Figure 4A:
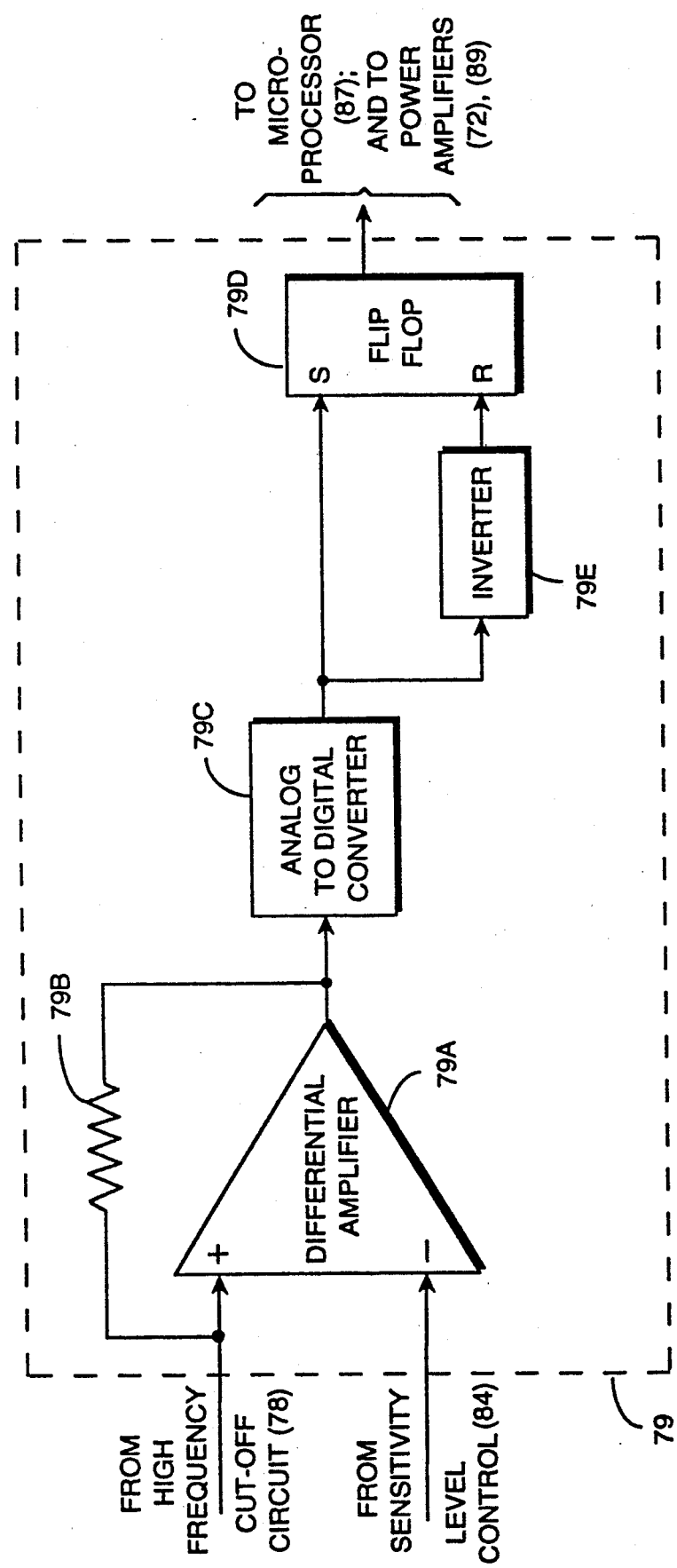
FIG. 4A is a block diagram of a switch circuit of the circuit of FIG. 4.

Considering now the switch circuit 79 is greater detail with reference to FIG. 4A, the switch circuit 79 generally comprises a differential amplifier 79A having a feedback resistor 79B connected between its output and the input from the high frequency cut-off circuit 78. The sensitivity level control 84 is connected to the negative input of amplifier 79A to provide a reference level voltage for its operation. An analog to digital converter 79C is coupled between the output of amplifier 79A and the set input of a flip flop 79D. In this regard, whenever the flip flop 79D is set, it provides an output signal to the microprocessor 87, and the power amplifiers 82 and 89 respectively. The output of the analog to digital converter 79C is also coupled to an invertor 79E whose output is connected to the reset side of the flip flop 79D.

In operation, whenever an output signal is generated by the cutoff circuit 78, the amplifier 79A responds and produces an analog signal on its output if the signal level from circuit 78 exceeds the reference voltage level provided by the sensitivity control circuit 84. If the amplifier 79A produces an output signal, the analog to digital converter 79C converts the signal into a digital signal that sets the flip flop 79D. The output from the flip flop 79D is then coupled to the pulse generator 72 enabling it to cause the device 84 to be activated. When the user removes his or her finger from the selected key, the output signal from the analog to digital converter 79C goes to a logic low level causing the flip flop 79D to be reset via the invertor 79E.

As best seen in FIG. 4, the output of &he switch circuit 79 has a pair of output terminals that are coupled to a microprocessor 87 and a power amplifier 89, respectively, for producing character codes and audible sounds, respectively. In this regard, the microprocessor 87 is coupled to each character key, such as key 35 via a set of conductors, such as a conductor 91. The microprocessor 87 in response to receiving a pulse from any given character key generates a character code that is coupled to the central processing unit 14 for processing and display purposes. In the preferred form of the present invention the character codes generated by the microprocessor 87 are ASCII codes which are well known to those skilled in the art.

In order to produce an audible sound when any given character key is depressed, such as the character 34 each of the keypad circuits, such as circuit 31A, are coupled to the power amplifier 89 via a data bus 92. The power amplifier 89 is coupled to a volume control circuit 94 having a variable resistor 96 to adjusting the output signal strength of the amplifier 89. A audio speaker 97 is coupled to the output of amplifier 89 for producing a audible sound in response to the output signal of the amplifier 89.

Referring now to the drawings and more particular to FIGS. 5–8 thereof, there is shown still yet another membrane keyboard construction system 110 which is constructed in accordance with the present invention and which is shown in operation position with a foldable computer 112 having a liquid crystal display panel 114 for visual image displaying purposes. In this regard, its should be understood that information generated by a user via the membrane keyboard system 110 is processed by the foldable computer 112 and displayed on the liquid crystal display panel 114.

Figure 5:
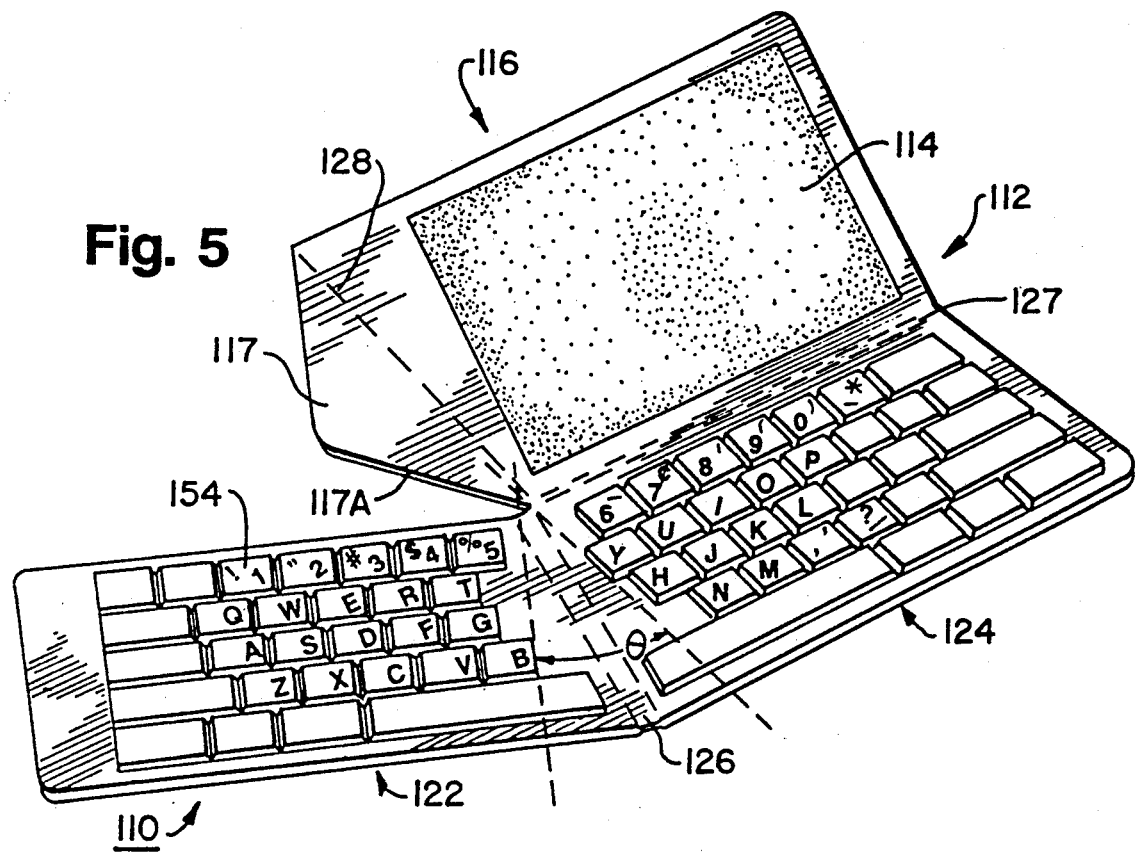
FIG. 5 is a pictorial view of another membrane keyboard constructed in accordance with the present invention and illustrated forming a part of a foldable computer having a liquid crystal display panel.
Figure 6:
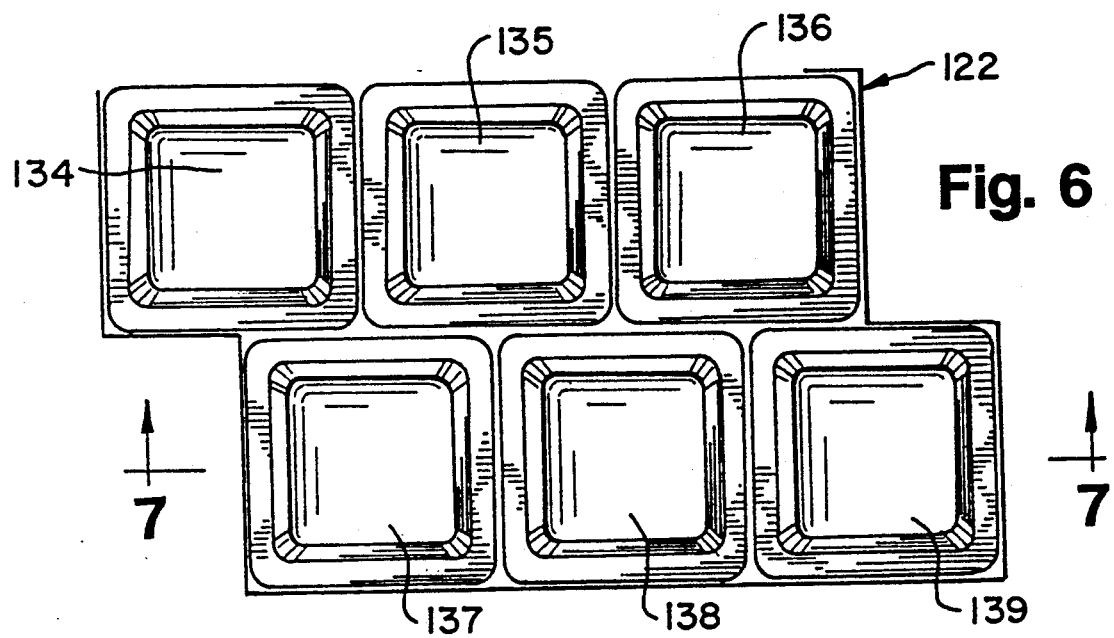
FIG. 6 is an enlarged face view of a group of representative keys of the keyboard of FIG. 5.
Figure 7:
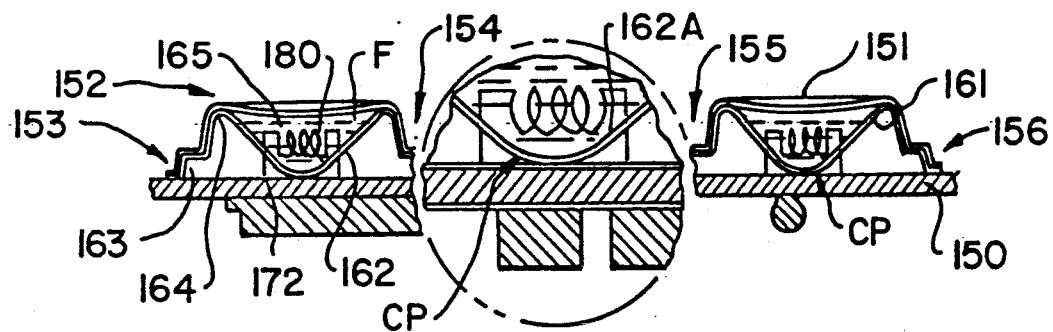
FIG. 7 is a sectional view of the keys of FIG. 6 taken substantially on line 7—7 thereof, illustrating an enlarged circled portion.

Considering now the membrane keyboard construction 110 system in greater detail with reference to FIG. 5–7, the system generally comprises a pair of membrane character key panels, a left panel 122 and a right panel 124 respectively, to facilitate rapid and efficient touch typing use. The system 110 also includes an electronic control unit 120 (FIG. 8) for producing ASCII character codes as well as sensory control signals. The panels 122 and 124 are spaced apart and oriented at an angle to one another for helping to establish a rapid data entry interface between a user (not shown) and the foldable computer 112.

The left panel 122 and the right panel 124 are interconnected by a living hinge 126 that permits the left panel 122 to be folded away from the right side panel 124. The hinge 126 also causes the left panel 122 and the right panel 124 to be disposed at an angle $\theta$ between their transverse dimensions when folded apart from one another as shown in FIG. 5. In this regard, the angle $\theta$ is between about 26° and a between about 36° A more preferred angle $\theta$ is between about 31° and about 36°, and a most preferred angle is about 31°.

A living hinge 127 enables the liquid crystal display panel 114 to be folded downwardly on top of the top side of the right panel 124. As best seen in FIG. 5, the liquid crystal display panel 114 is mounted in a housing 116 that includes a living hinge 128. The living hinge 128 permits a triangular flap or end portion 117 of the housing 116 to be folded backwardly so that a bottom edge 117A of the end portion 117 rests on the surface supporting the apparatus 110 to prop the panel 122 in a slightly backwardly inclined upright viewing position. In this regard, the end portion 117 supports the housing 116 in an upright manner so that the images on the panel 114 may be easily viewed by a user. In a closed position, the housing 116 folds downwardly on top of the topside of panel 124. The end portion 117 folds downwardly on top of the backside of the housing 116. The left panel 122 folds down upon the end panel 114 and right panel 124 to form a substantially thin flat configuration.

The configuration of the character keys and the angular relationship between the panels 122 and 124 are more fully described in the aforementioned U.S. patent application filed concurrently herewith and incorporated herein by reference. As the construction and method of using the panels 122 and 124 is substantially similar, only panel 122 will be described hereinafter in greater detail Although in the preferred form of the present invention, the panels 122 and 124 are configured as a computer keyboard, it will become apparent to one skilled in the art that the configuration and function the panels can be varied to accommodate may different types of applications such as calculator panels, cash register panels, and the like.

Considering now the panel 122 in greater detail with reference to FIGS. 5–7, panel 122 generally comprises a group of character keys, such as the character keys 134–139 which are collectively adjustable for tactile and audible responses. The character keys, such as keys 134–139 are formed from a pair of thin sheets of plastic material that have been individually molded for a desired character keypad layout such as the character keypad layout illustrated in FIG. 5. In this regard, the panel 122 includes an outer keypad sheet 151 and an inner or contact sheet 161 that form a group of character keys, such as a group of character keys 134–139. The keypad sheet 151 and contact sheet 161 are composed of a plastic material, such as thermoplastic material that may be easily formed into any desired configuration by any conventional forming technique, such as vacuum molding or injection molding in a similar manner as the membrane panel of FIG. 1.

The inner or contact sheet 161 also defines a group of contact points such as contact point "CP" (FIG. 7), that correspond to the individual character keys, such as the keys 134–139. In this regard, the contact sheet 161, establishes a communication path between the individual character keys, such as keys 134–139 and the electronic control unit 120 as will be explained hereinafter a greater detail in a manner similar to the membrane panel of FIG. 1.

Considering now the outer sheet 151 in greater detail with reference to FIGS. 5 and 6, the outer sheet 151 is molded into a series of spaced apart upwardly extending rectangularly shaped pads, such as the pad 152, that are integrally connected by a series of outer contact members, such as the members 153, 154 and 155. Each contact member, such as member 153, is configured in a shape that is substantially the same as a inner contact member, such as a inner contact member 163, formed in the contact sheet 161. In this regard, when the outer and inner sheets 151 and 161 respectively are molded together, each of their respective contact members, such as contact member 153 and 163 respectively, align in an overlapping nesting relationship with one another to define a secondary contact point for bonding the sheets 151 and 161 to a printed circuit board 150 as will be described hereinafter in greater detail. Each pad, such as pad 152, is adapted to receive on its top surface, character indicia, such as the character indicia 154 for helping to identify the function of the character key defined by the pad. In this regard, all of the pads in an individual row, such as pads 151 and 152, are arranged in a common plane for facilitating the construction of the panel 122.

Considering now the inner sheet 161 in greater detail with reference to FIG. 5 and 6, the inner sheet 161 is molded into a series of spaced apart cup shaped valleys, such as a valley 162 and 162A, that are integrally connected by contact members, such as the contact member 163 in a manner similar to the membrane panel of FIG. 1. As best seen in FIG. 6, the inner sheet 161 also includes a series of lips, such as annular lip or rim 164 that is intermediate of the valley and contact members, such as valley and contact members 162 and 163 respectively. Each lip, such as lip 164, defines a contact surface for bonding the outer and inner sheets 151 and 161 respectively together. In this regard, when the outer and inner sheets 151 and 161 respectively are bonded together, they form a series of cavities, such as a cavity 165, that are fluid tight.

For tactile sensory purposes, each of the cavities; such as the cavity 165, is filled with a fluid F that expands when heated thermally to cause the user to feel a slight impact as the inner and outer sheets deform slightly. The expansion of the fluid F and the outward deformation of the sheets also cause a slight audible sound to eminate therefrom.

The fluid F can be any non-conductive fluid that expands when thermally heated, such as acetone.

Figure 8:
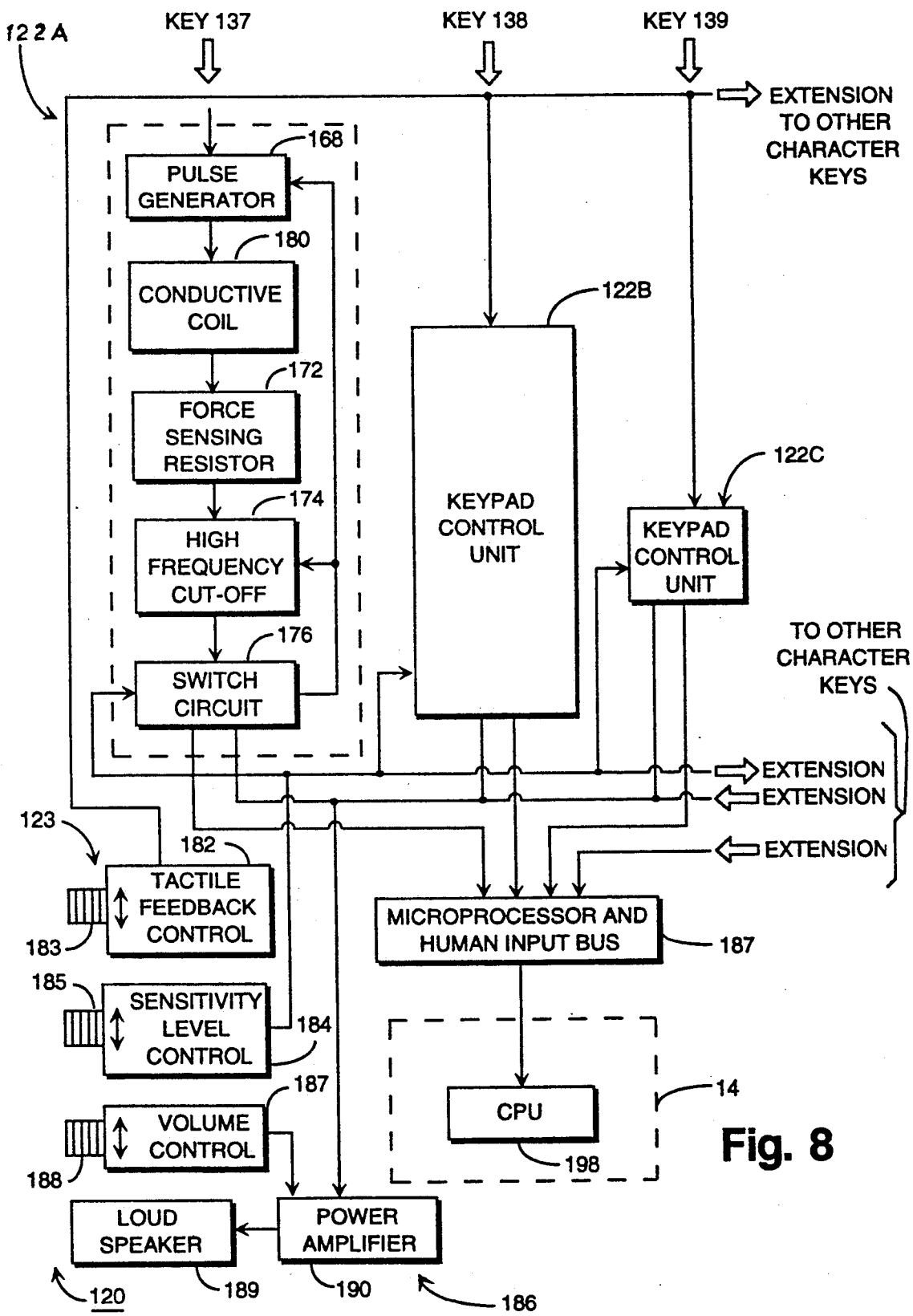
FIG. 8 is a block diagram of an electronic circuit arrangement for the keyboard of FIG. 5.

As shown in FIG. 8 for the purpose of causing the fluid in the individual cavities to expand in response to its key depression, each character key cavity has a conductive coil, such as a conductive coil 180 mounted therein for heating the fluid disposed inside the cavity. The individual coils are mounted within the character key cavities so that when energized they release thermal energy to cause the fluid therein to expand abruptly. With respect to mounting the coils within the cavities, each coil, such as coil 180, extend through holes (not shown) in the sheet 161, where each one of the holes are sealed in a fluid tight manner with the leads of the coils extending therethrough.

Considering now the electronic control unit 120 in greater detail with reference to FIG. 7 and 8, the electronic control unit 120 generally comprises a plurality of keypad control units, such as keypad control units 122A, 122B and 122C, for generating a character pulse signal and for causing a tactile response when a given key is depressed; and a sensory control unit 123 for permitting a user to adjust the sensory response features of the membrane keyboard 116.

Considering now the plurality of keypad control units, such as unit 122A in greater detail with reference to FIG. 8, as each of the control units are similar to one another, only unit 122A will be described hereinafter in greater detail. As best seen in FIG. 8, the control unit 122A includes a pulse generator 168 coupled to coil 180 for producing a tactile response and a force sensing resistor 172 coupled to a high frequency cutoff circuit or band pass circuit 174 and a switch circuit 176 cooperate which together to produce a sensing signal when the given character key is pressed.

Considering now the pulse generator 168 in greater detail with reference to FIG. 8, the pulse generator 168 is a conventional low voltage pulse circuit that produces a current pulse of approximately 250 milliamps whenever the key 137 is depressed. In this regard, the output of the pulse generator 168 is coupled to the small conducive coil 180 (FIG. 7) that is disposed in the cavity 165 and that is mounted to the printed circuit board 150.

In operation when the pulse generator 168 is energized, as will be explained hereinafter in greater detail, its output current pulse is coupled to the coil 180 which cause the electrical energy to be converted to thermal energy. In this regard, as the coil 180 is surrounded by a fluid that thermally expands when heated, the fluid experiences an immediate sharp rise in volume when heated, thus, causing the top of key pad 152 to move upwardly, to produce a tactile response sensed by the finger of the user depressing the key 137. Because the amount of thermal energy released by the coil 180 is so small, there is little or no build-up of temperature in the fluid, even when the key 137 is rapidly depressed. In this regard, the heat of the fluid normally tends to be dissipated through the inner sheet 161 and outer sheet 151.

For the purposes of causing the fluid to be directed primarily upwardly, the cup shaped valley 162 has an inverted conical or pyramid type of configuration and is relatively resistant to deformation by internal pressure, except at or about the area immediately surrounding the ridge or lip 164.

As best seen in FIG. 7, a bottom portion of each of the valleys, such as valley 162 rests directly on, or slightly above, a force sensing resistor, such as the force sensing resistor 172. In this regard, when a user depresses on the character key 137, the force is coupled to the resistor 172 which changes its conductivity in response to the exerted pressure. The high frequency cut off circuit 174 is coupled between the resistor 172 and the switch circuit 176 and function substantially the same as cutoff circuit 78. In this regard, if the key 137 is depressed for longer than a given interval the cutoff circuit 174 will generate a signal that is coupled to the switch circuit 176. As the circuit 174 and switch 176 are substantially similar to circuit 78 and switch 79 they will not be further described.

Considering now the sensory control unit 123 in greater detail with reference to FIG. 8, the sensory control unit 123 is substantially similar to control circuit 69 of FIG. 4. The control unit 122A includes a microprocessor 187 for generating appropriate ASCII character codes whenever selected character keys such as keys 134-139 are depressed. The character codes produced via the microprocessor 187 are sent to a central processing unit 198 forming part of the foldable computer 112. The control circuit 123 also includes a tactile feedback control circuit 182 having a control pot 183, a sensitivity level control circuit 184 having a control pot 185 and an audio control circuit, shown generally at 186 including a volume control circuit 187 having a control pot 188, a loud speaker 189 and a power amplifier 190. As the control circuit 123 and its various component parts are substantially similar to control circuit 69, the circuit 123 will not be described in further detail.

While particular embodiments of the present invention have been disclosed, it is to be understood that various different modifications are possible and are contemplated within the true spirit and scope of the appended claims. There is no intention, therefore, of limitation to the exact abstract or disclosure herein presented.

What is claimed is:

1. A membrane keyboard, comprising:

a housing;

a substrate mounted in said housing;

thin inner sheet means mounted on the top surface of said substrate;

thin outer sheet means mounted on the top surface of said inner sheet means having a plurality of spaced apart finger engageable recessed keypads for helping to form a plurality of membrane character keys;

said thin outer sheet means further having a plurality of spaced apart outer valley members for helping to facilitate arranging said plurality of membrane character keys in columns;

each one of said plurality of spaced apart outer valley members including a pair of spaced apart outer ridge members disposed along an imaginary orthogonal transverse line for helping to facilitate arranging said plurality of keypads in at least two rows oppositely disposed having substantially different heights;

electrical signal producing means for generating an electrical signal when individual ones of said plurality of membrane character keys are depressed by a user;

said thin inner sheet means including a plurality of spaced apart inner valley members for helping to facilitate arranging said plurality of membrane character keys in columns;

said thin inner sheet means further including a plurality of oppositely disposed cup-shaped valley member means disposed adjacent to said electrical signal producing means for facilitating the actuation of said signal producing means;

each one of said spaced apart inner valley members including a pair of spaced apart inner ridge members disposed along an imaginary orthogonal transverse line for helping to facilitate arranging said plurality of keypads in at least two oppositely disposed rows having substantially different heights;

means for connecting together said outer and said inner sheet means in a nesting manner to enable said thin outer sheet means and said thin inner sheet means to move in unison substantially simultaneously together in response to a user slightly depressing individual ones of said plurality of membrane character keys, so that individual ones of said keypads may be depressed slightly of casing individual ones of said plurality of cup-shaped valley members to engage said electrical signal producing means with a sufficient force to produce said electrical signal, whereby individual ones of the membrane character keys may be depressed rapidly in seriatim for information entry purposes.

2. A membrane keyboard according to claim 1 further comprising:

tactile means coupled to said plurality of character keys for causing individual ones of said character keys to produce a tactile response when depressed; and wherein said plurality of membrane character keys includes keypad means defining a contact engaging surface for each individual one of the plurality of membrane keys; and contact means bonded to the contact engaging surface of said key pad means for helping to facilitate the energization of said tactile means.

3. A membrane keyboard according to claim 2 wherein said keypad means includes a sheet of material formed into a plurality of integral spaced apart rectangularly shaped projections wherein each projection defines a character key pad forming part of said plurality of character keys.

4. A membrane keyboard according to claim 1 wherein the plurality of character keys are configured into at least one row of character keys.

5. A membrane keyboard according to claim 1 wherein the plurality of character keys are configured into rows and columns of individual character keys.

6. A membrane keyboard according to claim 1 wherein the individual rows of character keys are staggered from one another.

7. A membrane keyboard according to claim 1 wherein at least two character keys of such plurality of character keys have substantially different transverse heights.

8. A membrane keyboard according to claim 1 wherein the individual character keys are substantially identical in size and shape.

9. A membrane keyboard according to claim 1 wherein said plurality of character keys different from one another.

10. A membrane keyboard according to claim 1 wherein said thin outer sheet means is composed of a suitable plastic material.

11. A membrane keyboard according to claim 10 wherein said plastic material is a thermoplastic material.

12. A membrane keyboard according to claim 3 wherein said contact means includes a sheet of material formed into a plurality of integral space depart upwardly extending fingers for cooperating with corresponding ones of said plurality of projection to define said plurality of membrane character keys.

13. A membrane keyboard according to claim 12 wherein said upward extending fingers are configured in pairs wherein each pair of fingers cooperates with an individual one of said plurality of projections to define the height of the character key defined thereby.

14. A membrane keyboard according to claim 13 wherein each pair of fingers is separated by a cup shaped valley wherein a base portion of each valley defines a contact surface.

15. A membrane keyboard according to claim 2 wherein said tactile means is piezoelectric means.

16. A membrane keyboard according to claim 15 wherein said piezoelectric means includes a plurality of piezoelectric driver units.

17. A membrane keyboard according to claim 16 wherein each piezoelectric driver unit comprises:
   A piezoelectric actuator for producing a tactile response; and
   a power amplifier for generating an electrified signal to cause said actuator to produce a tactile response.

18. A membrane keyboard according to claim 17 further comprising:
   tactile feedback control means for causing said power amplifier to generate different levels of said electrical signal to enable the tactile response of said actuator to be adjusted.

19. A membrane keyboard according to claim 1 wherein said electrical signal producing means is force sensing resistor means.

20. A membrane keyboard according to claim 19 wherein said force sensing resistor means includes high frequency cut-off means coupled to switch means for generating electrical signals where individual ones of said plurality of membrane character keys are depressed.

21. A membrane keyboard according to claim 20 wherein said frequency cutoff means includes a plurality of high frequency cut off circuits for generating individual electrical signals when individual area of said plurality of membrane character keys are depressed.

22. A membrane keyboard according to claim 20 wherein said switch means includes a plurality of switches wherein each one of said plurality of switches is activated in response to an individual character key of said plurality of membrane character keys being depressed.

23. A membrane keyboard according to claim 1 further comprising:
   audio means for producing an audible sound in response to said force detecting means generating an electrical signal.

24. A membrane keyboard according to claim 1 further comprising:
   processor means for producing a coded signal in response to said force detecting means generating an electrical signal.

25. A membrane keyboard according to claim 24 wherein said coded signal is an ASCII coded signal.

26. A membrane keyboard according to claim 23 wherein said audio means includes volume control means for adjusting the decimal level of said audible sound.

27. A membrane keyboard according to claim 1 wherein
   said housing includes a right hand portion and a left hand portion, said right hand and left hand portions being separated by a small space;
   wherein said plurality of membrane character keys includes a right hand group of membrane key switch members and a left hand group of membrane key switch members;
   said right hand group of switch members being mounted in said right hand portion and being arranged in staggered rows and columns for facilitating right hand digit touch typing techniques;
   said left hand group of switch members being mounted in said left hand portion and being arranged in staggered rows and columns for facilitating left hand digit touch typing techniques; and
   said left and right hand groups being dispose at an angle $\theta$ relative to one another for helping the wrists nd forearms of a user to be maintained in a natural, relaxed manner when the left and right hand digits of the user are positioned on the keyboard.

* * * * *

UNITED STATES PATENT AND TRADEMARK OFFICE
CERTIFICATE OF CORRECTION

PATENT NO. : 5,212,473

DATED : May 18, 1993

INVENTOR(S) : William M. Louis

It is certified that error appears in the above-identified patent and that said Letters Patent is hereby corrected as shown below:

In the drawings, Sheet 2, Fig. 4, the line entering the pulse generator element 72 should be interconnected to the tactile feedback control element 80.

In the drawings, Sheet 2, Fig. 4, the reference numeral 74 should be indentified as PIEZOELECTRIC ACTUATOR.

In the drawings, Sheet 2, Fig. 4, the reference numeral 75 should be indentified FORCE SENSING RESISTOR.

In the drawings, Sheet 3, Fig. 4A, the "+" and "-" polarities illustrated for the differential amplifier element 79A should be reversed.

In the drawings, Sheet 6, Fig. 8, the line entering the pulse generator element 168 should be interconnected to the tactile feedback control element 182.

Column 7, Line 34, after "of", delete "&he" and substitute therefor--the--.

Column 12, Line 11, delete "of casing" and substitute therefor--for causing--.

Column 14, Line 19, after "claim 1" insert--,--.

Column 14, Line 20, after "wherein" insert--:--.

UNITED STATES PATENT AND TRADEMARK OFFICE
CERTIFICATE OF CORRECTION

PATENT NO. : 5,212,473
DATED : May 18, 1993
INVENTOR(S) : William M. Louis

It is certified that error appears in the above-indentified patent and that said Letters Patent is hereby corrected as shown below:

Column 14, Line 38, after "wrists" delete "nd" and substitute therefor-- and--.

Signed and Sealed this

Fifth Day of April, 1994

Attest:

BRUCE LEHMAN

*Attesting Officer*  *Commissioner of Patents and Trademarks*